United States Patent [19]
Christianson

[11] Patent Number: 5,953,157
[45] Date of Patent: Sep. 14, 1999

[54] NON-FOGGING SHOWER MIRROR USING PARALLEL WATER CONNECTION

[75] Inventor: Thomas R. Christianson, Napa, Calif.

[73] Assignee: Showertek, Inc., American Canyon, Calif.

[21] Appl. No.: 08/992,371

[22] Filed: Dec. 17, 1997

[51] Int. Cl.$^6$ .............................. G02B 5/08; G02B 7/182
[52] U.S. Cl. ........................... 359/509; 359/507; 359/512
[58] Field of Search .................................... 359/507, 509, 359/512, 514, 840, 845; 4/597, 605; 219/219, 522

[56] References Cited

U.S. PATENT DOCUMENTS

| | | | |
|---|---|---|---|
| Re. 32,906 | 4/1989 | Jones | 359/512 |
| 2,759,765 | 8/1956 | Pawley | 299/72 |
| 3,530,275 | 9/1970 | Rust | 219/219 |
| 3,594,063 | 7/1971 | Smilie, III | 359/509 |
| 4,150,869 | 4/1979 | Hansen | 359/509 |
| 4,327,961 | 5/1982 | Kladidis | 359/512 |
| 4,556,298 | 12/1985 | Gottlieb | 359/512 |
| 4,557,003 | 12/1985 | Jones | 4/605 |
| 4,655,559 | 4/1987 | Odell | 359/512 |
| 4,832,475 | 5/1989 | Daniels | 359/512 |
| 4,836,668 | 6/1989 | Christianson | 359/512 |

FOREIGN PATENT DOCUMENTS 1490373   11/1977   United Kingdom .

*Primary Examiner*—Thong Nguyen
*Attorney, Agent, or Firm*—David Pressman

[57] ABSTRACT

A fog-free shower mirror assembly comprises a mirror body (16) and an arm (18) connecting the body to a showerhead pipe (12). The arm is connected to the pipe by a T-fitting (14) that diverts warm water from the pipe to the mirror body. The T-fitting also returns the water after it passes through a heat transfer tube (56) in the mirror body. The arm is flexible and contains two inner tubes (36 and 38) for supply and return of the water. The arm is connected to the mirror body by a swivel fitting (20). The mirror body contains a thermal transfer disc (58) positioned between the heat transfer tube and the back of the mirror. Heat from the water in the heat transfer tube is thereby transferred to the mirror to keep it above the condensation point so as to maintain it fog-free. An additional mirror (68) that also is heated by heat from the heat transfer tube may be provided on an opposite side of the mirror body, also in thermal contact with the transfer tube. The two mirrors preferably are magnifying and non-magnifying, respectively.

26 Claims, 5 Drawing Sheets

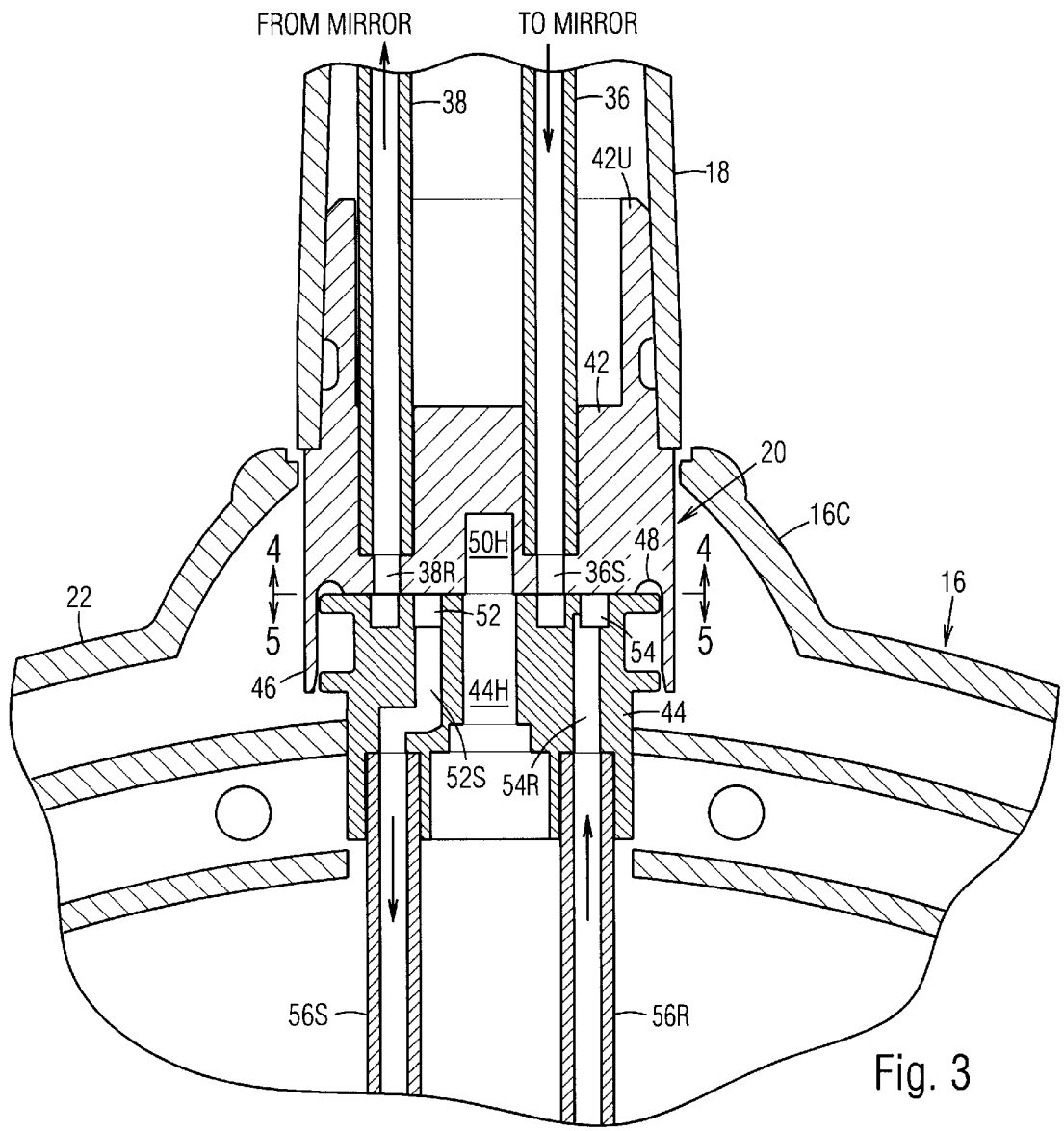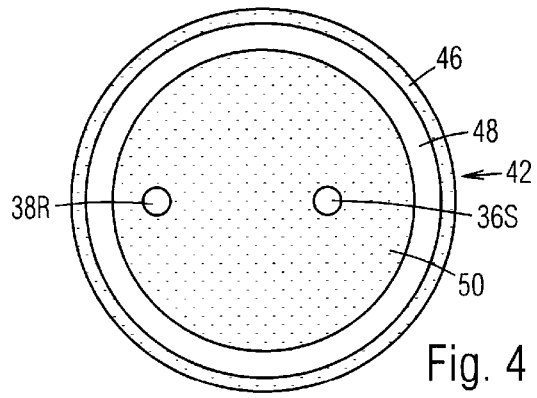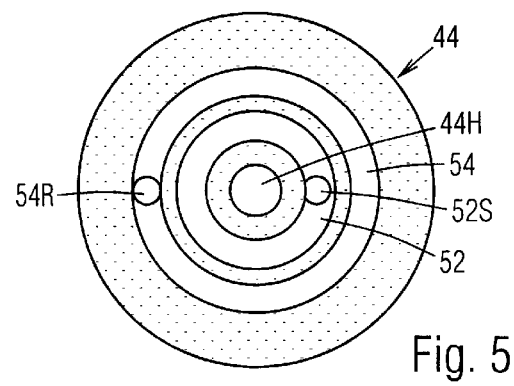

NON-FOGGING SHOWER MIRROR USING PARALLEL WATER CONNECTION

BACKGROUND

1. Field of Invention

This invention relates generally to shower mirrors, specifically to a non-fogging shower mirror that employs heated shower water.

2. Background—Prior Art

Shower mirrors that do not fog in the presence of warm water vapor are known. Such mirrors use either a chemical coating on the surface of the mirror or a means of heating the mirror to keep it fog-free.

Those mirrors that use a chemical coating to prevent fogging are not entirely effective. Also the chemical coating eventually wears off, whereupon the mirror fogs as much as an untreated mirror.

Mirrors in which heat is used to keep the mirror fog free are numerous.

For example, my U.S. Pat. No. 4,836,668 (1989) shows a fog-free shower mirror that is heated by water diverted from the shower arm to the back of the mirror. While effective and successful, this mirror wastes a small quantity of water that drips out of the bottom of the mirror assembly after it heats the mirror. Also, the diverted water slightly reduces the pressure of water coming out of the showerhead.

U.S. Pat. No. 3,530,275 to Rust (1970) shows an electrically heated mirror. This arrangement is dangerous since it requires electrical lines to be near water. Also this mirror is expensive to build and operate.

U.S. Pat. No. 4,327,961 to Kladitis (1982) shows a mirror backed by a compartment that the user fills with warm water to keep the mirror fog-free. This mirror is cumbersome to use and is fog-free only temporarily since the warm water must be replenished periodically.

U.S. Pat. No. 4,556,298 to Gottlieb (1985) shows a non-fogging bathroom mirror. It employs water diverted from the shower pipe to a multiply bent tube attached to the rear of a metal mirror. The water heats the tube and the tube in turn heats the mirror. However this system is disadvantageous because the pipe must be soldered or otherwise joined in heat conducting relation to the mirror. This requires that the mirror be made of a solderable material, such as brass. This material and the soldering procedure are expensive and unreliable. Also, unless a very thick, heavy, or highly conductive mirror is used, the tube will heat the mirror generally only in the area covered by the tube, so that only this area (having a pattern corresponding to the tube) will be fog-free; the rest of the mirror will be fogged.

U.S. Pat. No. 4,557,003 to Jones (1985) shows a shower mirror in which an arm with joints and two internal water conduits is connected from the shower pipe to the mirror housing. Water flows through a supply conduit in the arm to a plenum behind the mirror to heat the mirror. Then it flows through a return conduit in the arm back to the shower pipe. This system has a disadvantage in that the entire arm, including its joints and conduits, must be sealed so as to accommodate the entire line pressure of the water line. This is difficult and expensive to accomplish while still enabling the arm to be flexible. Further, designing a sealed plenum that is strong enough to withstand line pressure yet thin enough to transfer heat is very difficult.

OBJECTS AND ADVANTAGES

Accordingly, several objects and advantages of the invention are to provide an improved shower mirror, to provide a shower mirror which does not waste any water, which does not reduce the pressure of water coming out of the showerhead, which does not use electricity, which is economical, safe, and easy to use, buy, and operate, which maintains its fog-free condition as long as it is used, with no effort or action on the part of the user, which does not require soldering or pipe joining, which is made entirely fog-free, which does not use large moveable or flexible parts that carry water, which does not use a large sealed system with rotatable joints which must carry the full pressure of the water, which does not require a sealed plenum that must withstand the line pressure of the water, and which does not use chemicals or special coatings.

Other objects are to provide a shower mirror in which water does not contact a mirror directly, where it might damage the mirror, which does not use a large cavity which must carry water and be sealed under pressure, and which provides a heating system for both sides of a two-sided mirror and a fully rotatable frame for viewing either side.

Further objects and advantages will become apparent from a consideration of the ensuing description and the accompanying drawings.

DRAWING FIGURES

FIG. 3 is a sectional view of a swivel fitting which connects the arm to the body of the mirror assembly;

Figure 6:
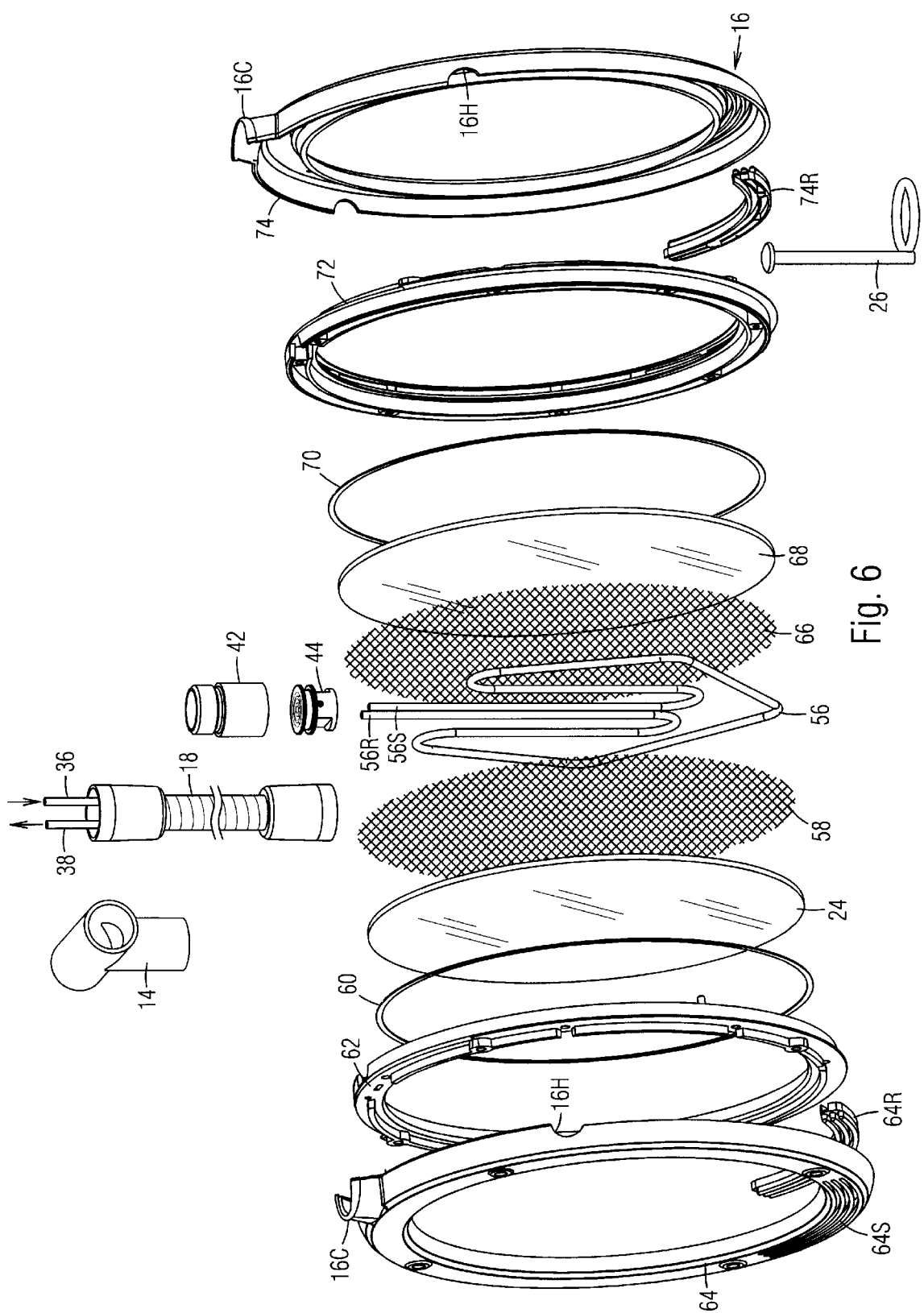

FIGS. 4 and 5 are views of parts of the swivel fitting taken in the direction indicated by lines 4 and 5, respectively, of FIG. 3;

FIG. 6 is an exploded view of a body of the mirror assembly; and

Figure 7:
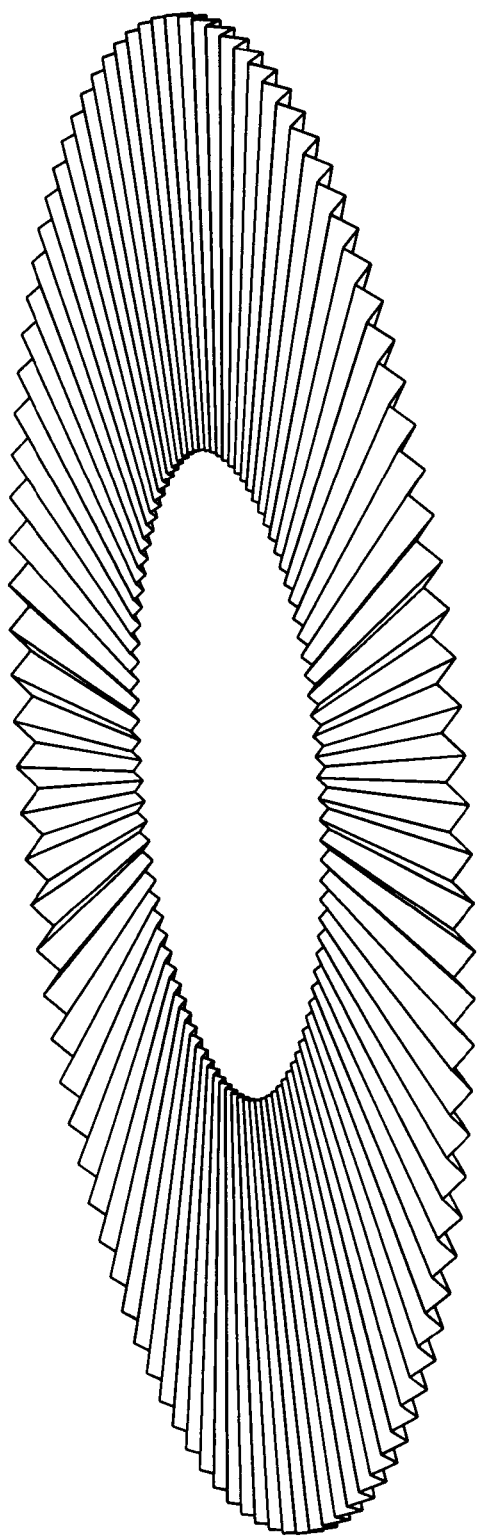

FIG. 7 is a perspective view of an alternative thermal transfer disc used in the body of the mirror assembly.

DRAWING REFERENCE NUMERALS 10 showerhead
12 showerhead pipe
14 T-fitting
16 mirror housing
18 flexible arm
20 swivel fitting
22 mirror frame
24 magnifying mirror
26 razor holder
28 inlet opening
30 outlet opening
32 passageway
32R return inlet
32S upstream exit
34 barrier wall
34' restriction opening
36 supply tube
36S supply hole
38 return tube
38R return hole
40 vertical leg
42 female part of swivel
44 male part of swivel
44H screw hole
46 skirt 48 moat
50 central platform
50H threaded hole
52 inner moat
54 outer moat
52S supply hole
54R return hole
56 heat transfer tube
56S supply end
56R return end
58 thermal transfer disc
60 gasket
62 holding ring
64 beauty ring
64S slits
66 thermal transfer disc
68 flat mirror
70 gasket
72 holding ring
74 rear beauty ring
74R gripping strip

SUMMARY

In accordance with the invention, a fog-free shower mirror assembly comprises a mirror body and an arm connecting the body to a showerhead pipe. A T-fitting that diverts warm water from the pipe to the mirror body connects the arm to the pipe. The T-fitting also returns the water after it passes through a heat transfer tube in the mirror body, thus providing a parallel water connection. The arm is flexible and contains two inner tubes for supply and return of the water. The arm is connected to the mirror body by a swivel fitting. The mirror body contains a thermal transfer layer or plate positioned between the heat transfer tube and the back of the mirror. This layer transfers heat from the water in the heat transfer tube to the mirror to keep it above the condensation point so as to maintain it fog-free. An additional mirror that also is heated by heat from the heat transfer tube may be provided on an opposite side of the mirror body, also in thermal contact with the heat transfer tube. The two mirrors preferably are magnifying and non-magnifying, respectively.

Figure 1:
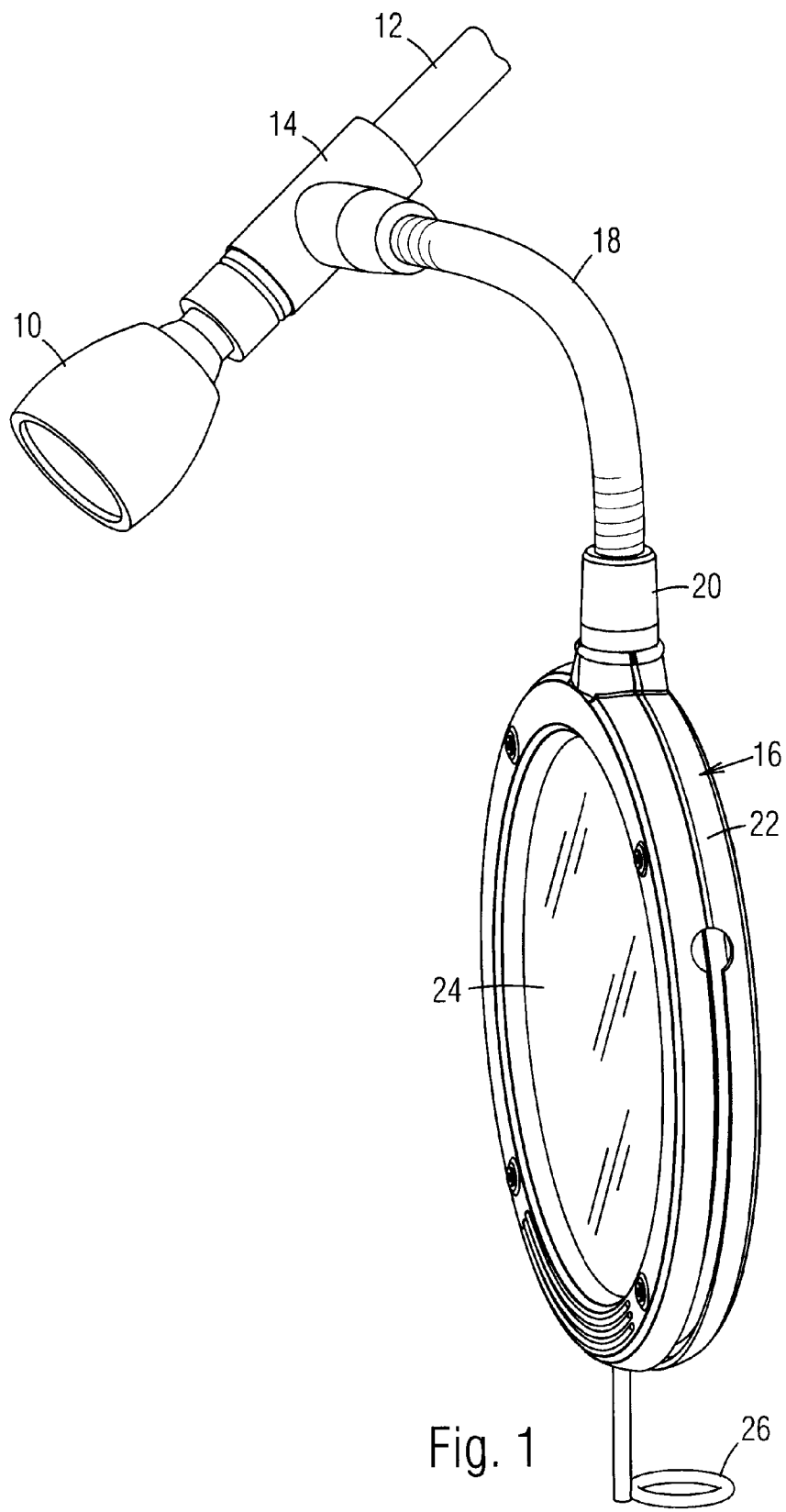
FIG. 1 is a perspective view of a fog-free mirror assembly attached to a showerhead pipe according to the invention.

FIG. 1—Description and Operation of Major Components

A fog-free mirror assembly according to the invention is shown in perspective view attached to a showerhead pipe in FIG. 1. Warm water is supplied to a conventional showerhead 10 from a conventional showerhead pipe 12. Connected between pipe 12 and showerhead 10 is a T-fitting 14 which is shown in more detail in FIG. 2. The T-fitting is connected to a mirror housing 16 by a flexible arm 18. Arm 18 is connected to housing 16 by a swivel fitting 20, shown in more detail in FIGS. 3 to 5. Mirror housing 16 comprises a mirror frame 22, a magnifying mirror 24, and other components that are shown in more detail in FIG. 2. Finally, a razor holder 26 is connected to frame 22.

The mirror assembly operates generally as follows: Some of the warm water flowing from pipe 12 to head 10 is diverted, drawn, or tapped by T-fitting 14 to a supply tube (not shown in FIG. 1) within arm 18. This diverted water flows through the supply tube to mirror housing 16. The water flows through a heat-transfer tube (not shown) in the housing. This heat-transfer tube in turn heats a heat dispersal disc that in turn heats the mirror in a relatively uniform manner to keep it fog-free. Then the water returns through a return tube (not shown) in arm 18 back to the T-fitting. The return water joins the main flow of water in the T-fitting and then it flows out of head 10 in normal fashion.

Figure 2:
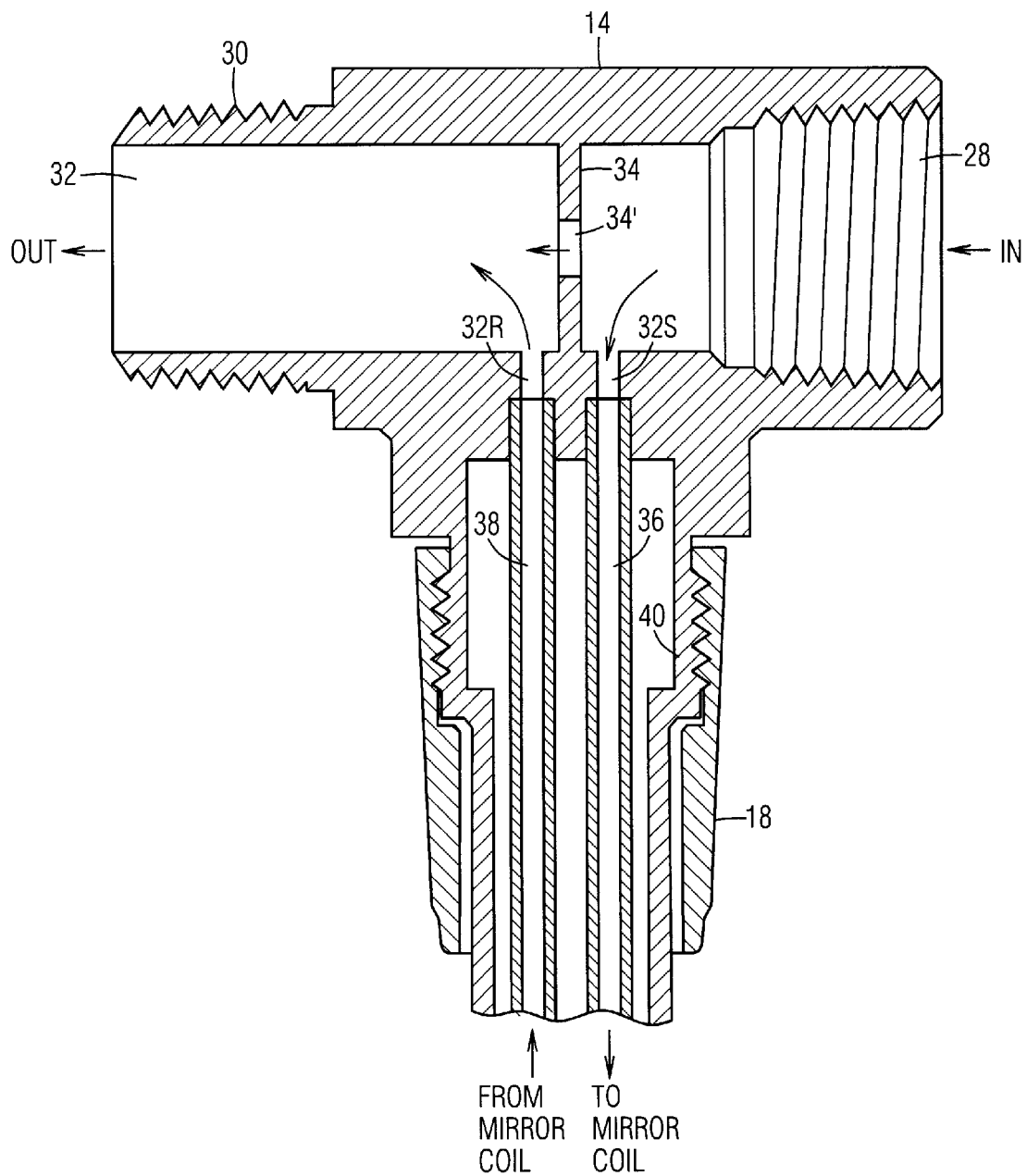
FIG. 2 is a sectional view of a part of the mirror assembly where a T-fitting connects an arm of the mirror to the showerhead pipe.

FIG. 2—Description and Operation of T-Fitting

T-fitting 14 of FIG. 1 may be made of brass or plastic and is shown in detail in the cross-sectional view of FIG. 2. It comprises an inlet opening 28 with female threads on the right side of the top bar of the "T", and an outlet opening 30 with male threads on the left side of the top bar of the "T". A passageway 32 connects inlet 28 to outlet 30 and includes a barrier wall or partition 34 having a restriction opening 34' that has a narrower cross-sectional area (19.6 sq. mm) and smaller diameter (5 mm) than passageway 32 (154 sq. mm in area and 1.4 cm in diameter). Due to wall 34 and opening 34', water flowing through passageway 32 will encounter resistance and so will have a pressure drop across the wall. As a result the pressure will be higher on the right or upstream side of wall 34 than on the downstream or left side of wall 34.

The portion of passageway 32 on the upstream side of wall 34 is coupled via an upstream outlet or supply 32S to a mirror supply tube 36, while the downstream side is connected via a return inlet 32R to mirror return tube 38. Tubes 36 and 38 run through arm 18 (FIGS. 1 and 2) with their upper ends terminating and joined to supply 32S and return 32R, respectively, in vertical leg 40 of the "T". Vertical leg 40 has male threads and is threaddedly mated with arm 18, which has female threads. The cross-sectional configurations of inlet opening 28, outlet opening 30, and vertical leg 40 are circular.

In operation, the user connects the horizontal or top arms of the T-fitting in series with the showerhead (as illustrated in FIG. 1) as follows. The showerhead is unscrewed from its pipe, inlet 28 of the T-fitting is screwed onto the end of the pipe, and the showerhead is screwed onto outlet 30 of the T fitting.

When the water is turned on to the showerhead from a conventional valve (not shown), most of the water will flow through the horizontal arm of the T-fitting via passageway 32, including opening 34', and then out of outlet 30 to the showerhead. Due to the higher pressure on the upstream side, some water will be forced into upstream supply hole 32S and down supply tube 36 to the mirror housing and then back through return tube 38 to return 32R and then to the downstream side of barrier 34. The returning water from the mirror housing will rejoin the main stream of water flowing through passageway 32 and both components of water will leave outlet 30 to flow out of the showerhead.

FIGS. 3–5—Description and Operation of Arm and Swivel Joint

T-fitting 14 is connected to swivel joint 20 (FIG. 3) by arm 18. Arm 18 may be made of brass, plastic, or any other suitable material and has a known wound spiral gooseneck-like construction (FIG. 1) so that it can be bent to and will remain stably in any desired orientation. It contains and protects supply tube 36 and return tube 38, which preferably are made of flexible plastic or brass. Arm 18 preferably is about 22 cm long and about 2.5 cm in diameter and tubes 36 and 38 are about 6 mm in diameter.

Swivel joint 20 enables mirror housing 16 to be rotated to any orientation with respect to arm 18 so that the user can position the mirror as desired. Joint 20 has two parts: an upper, female part 42 (FIG. 4) and a rotatably mating, lower, and male part 44 (FIG. 5) which fits in, or is telescopingly mated with, female part 42.

Tubes 36 and 38 within arm 18 terminate at their distal or lower end in female part 42 which has two through holes: a radially inward supply hole 36S (where the water leaves female part 42) and a radially outward return hole 38R (where the water returns to upper part 42). The ends of tubes 36 and 38 are fixedly embedded in holes 36S and 38R, respectively. Each hole has a larger diameter top portion and a narrower diameter bottom portion with an upwardly facing shoulder or stop at the junction between these portions to limit the degree of insertion of tubes 36 and 38.

Female or upper part 42, which also may be made of brass or plastic, has an upwardly projecting cylindrical portion 42U that is joined to the inside of inside arm 18. The lower end of female part 42 (FIG. 4) has a projecting skirt 46, a circular groove or moat 48 adjacent the skirt, and a central platform 50 which contains holes 38R and 36S. Note that return hole 38R is radially farther out than supply hole 36S, for a purpose to be covered below. Platform 50 also contains a central threaded hole 50H for receiving a screw (not shown) to hold male part 44 within the female part.

The upper face of male or lower part 44 (FIG. 5) has a through hole 44H for a fastening screw (not shown). One of the upper and lower parts (42 and 44) has a pair of concentric, circular moats in floats communication with two through holes in the other of these parts. As shown, lower part 44 has the two concentric grooves or moats 52 and 54.

Inner or supply moat 52 is the same, lesser radial distance out from the center as supply hole 36S of female part 42 so as to always mate therewith. Moat 52 is also coupled to a through hole 52S in male part 44 for receiving input water from the moat and hence from hole 36S and supplying it to the mirror heating tube, infra.

Outer or return moat 54 is the same, greater radial distance out from the center as return hole 38R of female part 42 and is coupled to a through hole 54R for receiving water from the mirror and returning it to return hole 38R. Through holes 52S and 54R are enlarged in the lower face of male part 44 to receive and hold the ends 56S and 56R, respectively, of heat transfer tube 56 (FIG. 6). Screw hole 44H is enlarged at the lower face of male part 44 to mate with the head of the fastening screw (not shown).

The swivel fitting also joins arm 18 to mirror housing 16 of the housing.

In operation, warm water is supplied via supply tube 36 to hole 36S in upper part 42. Hole 36S always communicates with inner or supply moat 52 of the male part regardless of the relative rotated positions of the male and female parts. This is because hole 36S in female, upper part 42 is at the same radial distance from the center as is moat 52 in lower, male part 44. Thus the water will fill inner moat 52 and will then travel through hole 52S to upper or supply part 56S of the heat transfer tube 56. After traveling around the tube and heating the mirror, the warm water will flow to upper or return part 56R of tube 56 and then to hole 54R and outer moat 54.

Since outer or return moat 54 is at the same radial distance from the center as hole 38R, moat 54 is always in communication with hole 38R of the female part. Thus the returning water will pass through hole 38R and then back to return tube 38. From return tube 38 the water will, as stated, flow into hole 32R (FIG. 2) in the T-fitting and then to the downstream side of passageway 32 to the showerhead.

The water will flow from supply tube 36, through heat transfer tube 56, and back through return tube 38 without interruption or impediment regardless of the orientation of the male and female parts of the swivel head due to moats 52 and 54. Thus, mirror housing 16 can be rotated infinitely with respect to arm 18 without affecting the function of the mirror.

FIG. 6—Description and Operation of Mirror Housing

FIG. 6 shows an exploded view of the mirror housing and the other components. T-fitting 14 is shown in gross view, as is arm 18 and upper and lower parts 42 and 44 of the swivel joint. The upper ends 56S and 56R of heat-transfer tube 56 are shown free, but in practice they are attached to the through holes in lower part 44 as shown in FIG. 3. Tube 56 has multiple bends, i.e., a serpentine, curvilinear, or sinuous configuration, so that it covers as much of the area of the mirror as possible.

On the left side of tube 56 is a thermal transfer or heat-dispersing disc 58, e.g., of woven copper mesh or cloth. Disc 58 may preferably has a wire density of 39×39 wires per square cm. (100×100 per sq. in.), with each wire being about 114 microns (4.5 mils) in diameter.

To the left of disc 58 is magnifying mirror 24. Mirror 24 is preferably made of acrylic or glass and is shown flat, but is concave when seen from the left or front so as to provide magnification. When seen from the right or back it is convex so as to form the familiar meniscus or dish shape.

To the left of mirror 24 is a gasket 60, a holding ring 62, and a front beauty ring 64. Ring 64 has a series of concentric slits 64S at its bottom part. A rubber gripping strip 64R with mating ridges is positioned between rings 62 and 64 so that when the parts are assembled (drawn together by fastening screws—not shown), the ridges of strip 64R protrude through slits 64S to provide a gripping surface on the front. Collar 16C on ring 64 may be made of plastic and ring 62 may be made of brass or plastic. The housing preferably is 15 to 17 cm in diameter.

On the right side of tube 56 is another heat dispersing disc 66, e.g., of copper mesh or cloth.

To the right of disc 66 is flat (non-magnifying) mirror 68.

To the right of mirror 68 is a gasket 70, a holding ring 72, and a rear beauty ring 74. Like ring 64, ring 74 has a series of concentric slits at its bottom part. A rubber gripping strip 74R with mating ridges is positioned between rings 72 and 74 so that when the parts are assembled, the ridges of strip 74R protrude through the concentric slits to provide a rear gripping surface.

Screws (not shown) attach the parts together, press tube 56 in good thermal contact with discs 58 and 66, press discs 58 and 66 in good contact with mirrors 24 and 68, and extend from holding ring 62 to ring 74.

In operation, when warm water flows through tube 56, it heats heat dispersal transfer discs 58 and 66. Each of these discs receives heat in the relatively small area of its inner side in contact with tube 56 and disperses this heat to a relatively broad area on its outer side. Since each disc's outer side is in contact with its respective mirror (24 or 68), it heats its mirror in a relatively uniform manner to keep it fog-free. Although mirror 24 is a meniscus, disc 58 is sufficiently compressible to provide a good thermal coupling between tube 56 and mirror 24.

The mirror housing has a hole 16H so that the head of razor holder 26 can be inserted and allowed to drop down to the bottom of the housing as shown in FIG. 1. The outer diameters of rings 62 and 72 are sufficiently smaller than the inner diameters of rings 64 and 74 to provide space for the head of the razor holder to pass between the two sets of rings.

Operation

The operation of the overall system has been generally described above in the description of FIG. 1 and the operation of the individual components has also been described above under their individual figures. The operation of the overall system will now be capitulated with reference to the specific components.

After installing the mirror assembly between the shower pipe and the showerhead as explained above and as shown in FIG. 1, the user turns on the water at the usual warm temperature. Water flows through pipe 12, passageway 32 of T-fitting 14, and out showerhead 10. In the T-fitting, due to wall 34 and its restriction opening 34', the pressure of the water on the upstream side of wall 34 is higher than on the downstream side. Thus water will flow into opening 32S and tube 36 in arm 18, around thermal transfer tube 56 (FIG. 6), back through tube 38 and opening 32R (FIG. 2), and into the downstream side of partition 34. This returning water will recombine with the main stream flowing through passageway 32 and will flow out the showerhead. Thus no water will be wasted in heating the mirrors in housing 22.

Since arm 18 and its contained tubes 36 and 38 are flexible, the arm can be positioned as desired. Swivel connection 20 enables mirror housing 16 to be rotated to any position with respect to arm 18, as explained above.

The water flowing through tube 56 (FIG. 6) will heat this tube, and, in turn, thermal transfer discs 58 and 66. These discs are good conductors and are in good thermal contact with the backs of meniscus mirror 24 and flat mirror 68, respectively, so that they will heat these mirrors relatively uniformly and thereby prevent water vapor in the shower stall from condensing anywhere on the fronts of these mirrors. For general viewing, the user can rotate the mirror housing so that the flat mirror faces the flat user, and for close-up work, the user rotates the housing so that the magnifying mirror faces the user. The present mirror is particularly useful when shaving since it enables the user to shave with a clear mirror in a steamy, watery environment, when his whiskers (or her axillary hairs) are expanded and softened and when the shaving debris can be best washed away.

FIG. 7—Alternative Thermal Transfer Disc

In lieu of circular mesh sheet 58, the thermal transfer disc between tube 56 and the magnifying mirror can be a radially fluted disc, as shown in FIG. 7. This disc will also thermally couple and spread the concentrated heat from tube 56 to mirror 24. The disc has radial folds or flutes that make it flexible and thus able to contact a large area of the mirror. It is open in its center since it is not possible to extend the folds to the center.

Conclusion, Ramifications, and Scope

Accordingly the reader will see that, according to the invention, I have provided an improved shower mirror which (a) does not waste any water, (b) reduce the pressure of water coming out of the showerhead, (c) does not use electricity, is economical, safe, and easy to use, buy, and operate, (d) maintains its fog-free condition as long as it is in use with no effort or action on the part of the user, (e) does not require soldering or pipe joining, (f) does not use large moveable or flexible parts that carry water, (g) does not use chemicals or special coatings, (h) does not use a large sealed system with rotatable joints which must carry the full pressure of the water, (i) does not use water which contacts a mirror directly, where it might damage the mirror, and (j) does not use a plenum or large cavity which must carry water.

While the above description contains many specificities, these should not be construed as limitations on the scope of the invention, but as exemplifications of the presently preferred embodiments thereof. Many other ramifications and variations are possible within the teachings of the invention. For example, the sizes and materials of all parts can readily be changed. Thermal transfer plates of different shapes can be used, or such plates can be eliminated. The thermal transfer tube can be any conduit that will transfer its heat to the back of the mirror. E.g., it can be (a) made longer so as to contact a greater percentage area of the heat dispersal plate, (b) a helical coil of tubing which spirals from the outside to the center and then spirals from the center back to the outside by a continuous coil with two interspersed sections, (c) a set of parallel tubes with a supply header and a return header, or (d) a hollow flat housing with an inlet and an outlet. The mirror housing can be molded in place, around the mirrors and tube. The barrier and its hole in the T-fitting can be changed in shape. The swivel joint can be eliminated, at some loss of flexibility. In lieu of the showerhead and its pipe, the shower mirror can be connected to any other water supply duct.

Thus the scope of the invention should be determined by the appended claims and their legal equivalents, and not by the examples given.

I claim:

1. A mirror assembly for connection to a water supply duct, comprising:

a fitting for connection to a water supply duct and for drawing off a portion of any water flowing in said duct, a hollow mounting arm, said arm containing a mirror supply tube having a distal end and also having a proximal end connected to said fitting for receiving said water drawn off from said water supply duct, a thermal transfer conduit having supply and outlet ends, said supply end being connected to said distal end of said mirror supply tube, a heat dispersal member in thermal contact with said thermal transfer conduit, a mirror having a reflecting surface and a back in thermal contact with said heat dispersal member, said mirror also being connected to said distal end of said hollow mounting arm, a mirror return tube having a proximal end and also having a distal end connected to said outlet end of said thermal transfer conduit, said mirror return tube also being positioned in said hollow mounting arm, said proximal end of said mirror return tube being connected to said fitting, said fitting also connected to return water in said return tube to said water supply duct.

2. The mirror assembly of claim 1 wherein said fitting is a T-fitting having a top passageway which can be connected in series with said water supply duct and a leg which communicates with said top passageway and said mirror supply and mirror return tubes.

3. The mirror assembly of claim 1 wherein said hollow mounting arm and said mirror supply and mirror return tubes therein are flexible.

4. The mirror assembly of claim 1 wherein said thermal transfer conduit is a tube having multiple bends.

5. The mirror assembly of claim 1, further including a mirror housing for holding said mirror and said thermal transfer conduit, said mounting arm connecting said fitting to said housing.

6. The mirror assembly of claim 5, further including a swivel fitting connecting said mounting arm to said housing, said swivel fitting enabling said housing to pivot with respect to said arm.

7. The mirror assembly of claim 6 wherein said swivel fitting comprises upper and lower rotatably connected parts, said upper part having two through holes connected to said mirror supply tube and said mirror return tube, respectively, said lower part being connected to said supply and outlet ends of said thermal transfer conduit, said lower part having a pair of circular moats in fluid communication with said two through holes of said upper part, whereby said upper and lower parts can be rotated with respect to each other, yet still allow two channels of water to flow through said parts.

8. The mirror assembly of claim 1 wherein said water supply duct is a showerhead supply pipe and a showerhead, and wherein said fitting is connected between said showerhead supply pipe and said showerhead.

9. The mirror assembly of claim 1, further including a second mirror having a reflecting front and a back in thermal contact with said conduit, said second mirror also being connected to said distal end of said hollow mounting arm.

10. A shower mirror assembly for connection to a showerhead pipe and a showerhead, comprising:

a fitting for connection in a showerhead supply pipe for allowing water to flow through said showerhead supply pipe while also drawing some water from said showerhead supply pipe and returning said water to said showerhead supply pipe, said fitting containing first and second ducts for drawing and returning said water, respectively, a hollow mounting arm having a proximal end connected to said fitting and also having a distal end, said hollow mounting arm containing a mirror supply tube having a distal end and also having a proximal end connected to said first duct for receiving said water drawn from said showerhead supply pipe, said hollow mounting arm also containing a mirror return tube connected to return said water drawn from said showerhead supply pipe to said second duct, a mirror housing connected to said distal end of said hollow mounting arm, a thermal transfer conduit in said mirror housing having supply and outlet ends, said supply end being connected to said distal end of said mirror supply tube, said outlet end being connected to said mirror return tube, a heat dispersal member in thermal contact with said thermal transfer conduit, a mirror in said mirror housing having a reflecting surface and a back in thermal contact with said heat dispersal member.

11. The mirror assembly of claim 10 wherein said fitting is a T-fitting having a top passageway which can be connected in series with said showerhead pipe and a leg which communicates with said top passageway and contains said first and second ducts.

12. The mirror assembly of claim 10 wherein said hollow mounting arm and said mirror supply and mirror return tubes therein are flexible.

13. The mirror assembly of claim 10 wherein said thermal transfer conduit is a tube having multiple bends.

14. The mirror assembly of claim 10, further including a swivel fitting connecting said mounting arm to said housing, said swivel fitting enabling said housing to pivot with respect to said arm.

15. The mirror assembly of claim 14 wherein said swivel fitting comprises upper and lower rotatably connected parts, said upper part having two through holes connected to said mirror supply tube and said mirror return tube, respectively, said lower part being connected to said supply and outlet ends of said thermal transfer conduit, said lower part having a pair of circular moats in fluid communication with said two through holes of said upper part, whereby said upper and lower parts can be rotated with respect to each other, yet still allow two channels of water to flow through said parts.

16. The mirror assembly of claim 10 wherein said fitting is connected between said showerhead supply pipe and said showerhead.

17. The mirror assembly of claim 10, further including a second mirror in said housing and having a reflecting front and a back in thermal contact with said conduit, sad second mirror also being connected to said distal end of said hollow mounting arm.

18. In an environment which is vaporous due to warn water flowing from a pipe into said environment, a method for preventing a mirror in said environment from fogging, comprising:

tapping a portion of said warm water flowing through said pipe, providing a thermal transfer conduit and causing said portion of water so tapped to flow through said thermal transfer conduit and back to said pipe and into said environment, providing a heat dispersal member in thermal contact with said thermal transfer conduit, and providing a mirror in thermal contact with said heat dispersal member, whereby said warm water flowing through said thermal transfer conduit will heat said conduit and hence said heat dispersal member, and said heat dispersal member will heat said mirror in a relatively uniform manner to prevent it from fogging.

19. The method of claim 18 wherein said portion of water so tapped which flows through said thermal transfer conduit is done by providing a T-fitting having a top passageway which can be connected in series with said pipe and a leg which contains mirror supply and mirror return tubes therein, said tubes communicating with said thermal transfer conduit.

20. The method of claim 19 wherein said leg and said mirror supply and mirror return tubes therein are flexible.

21. The method of claim 18 wherein said thermal transfer conduit is a tube which has multiple bends.

22. The method of claim 18, further including a mirror housing for holding said mirror and said thermal transfer conduit, and wherein said portion of water so tapped which flows through said thermal transfer conduit is done by providing a T-fitting having a top passageway which can be connected in series with said pipe and a leg which contains parts of mirror supply and mirror return tubes therein, said tubes communicating with said thermal transfer conduit, and also including a mounting arm connecting said fitting to said housing and containing parts of said mirror supply and mirror return tubes.

23. The method of claim 22, further including a swivel fitting connecting said mounting arm to said housing, said swivel fitting enabling said housing to pivot with respect to said arm.

24. The method of claim 23 wherein said swivel fitting comprises upper and lower rotatably connected parts, said upper part having two through holes connected to said mirror supply tube and said mirror return tube, respectively, said lower part being connected to said supply and outlet ends of said thermal transfer conduit, said lower part having a pair of moats in fluid communication with said two through holes of said upper part, whereby said upper and lower parts can be rotated with respect to each other, yet still allow two channels of water to flow through said parts.

25. The method of claim 18 wherein said pipe is a showerhead supply pipe, and wherein said portion of water so tapped which flows through said thermal transfer conduit is done by providing a T-fitting having a top passageway which is connected between said showerhead supply pipe and said showerhead, said T-fitting having a leg which contains mirror supply and mirror return tubes therein, said tubes communicating with said thermal transfer conduit.

26. The method of claim 18, further including a second mirror having a reflecting front and a back in thermal contact with said thermal transfer conduit.

* * * * *